Figure 4:
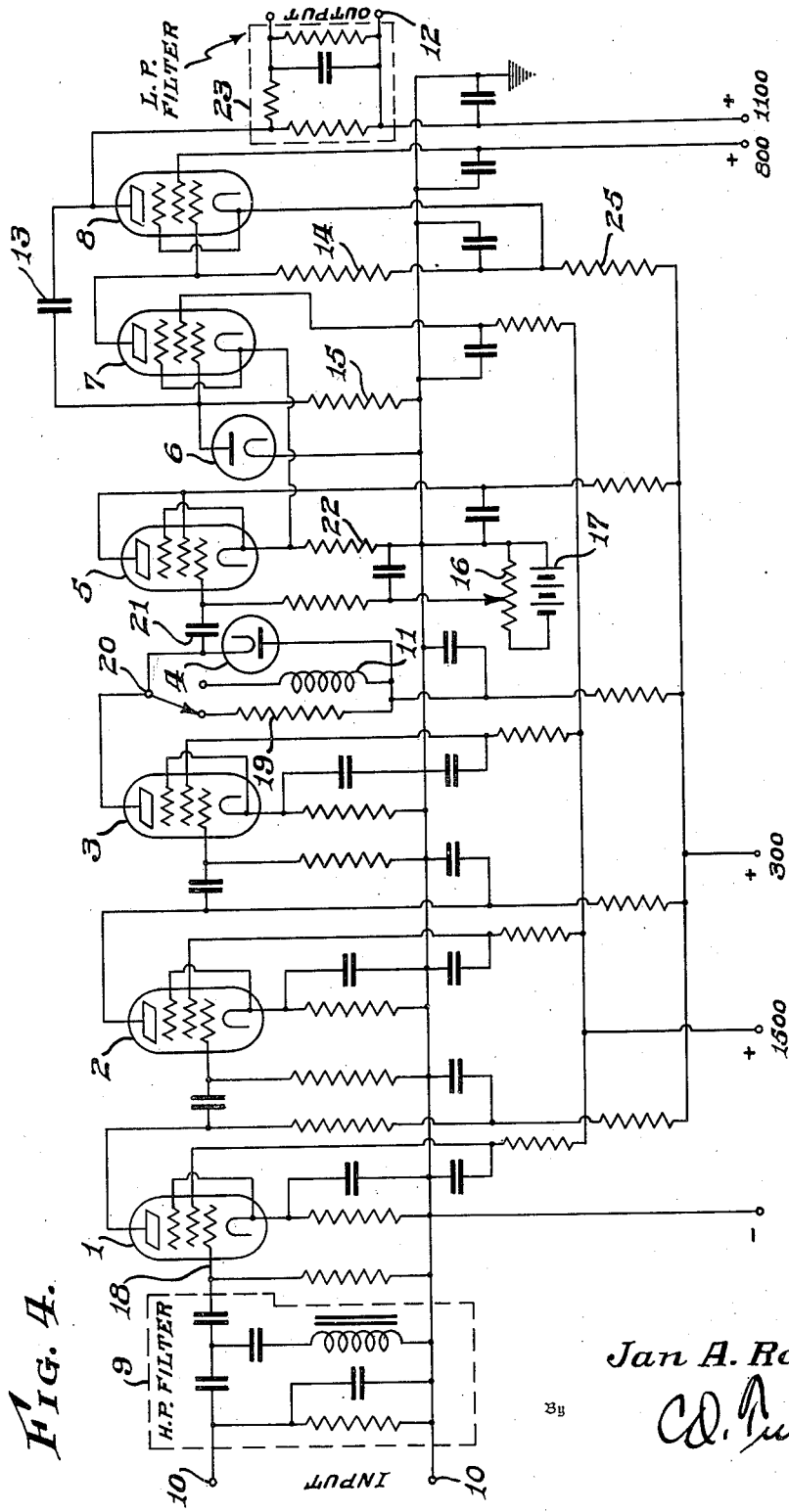

May 6, 1947.  J. A. RAJCHMAN  2,420,013
ELECTRON COMPUTING DEVICE
Original Filed April 1, 1942    3 Sheets-Sheet 1
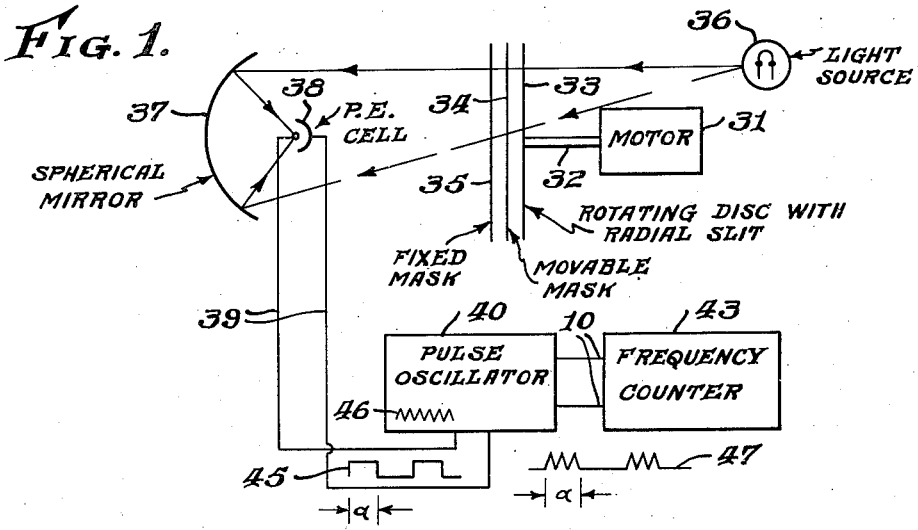
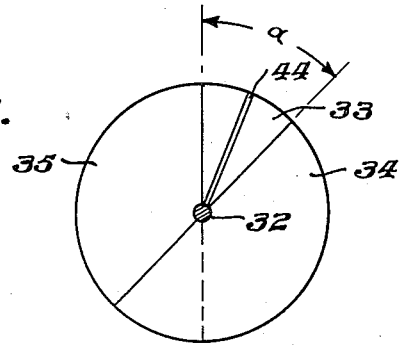
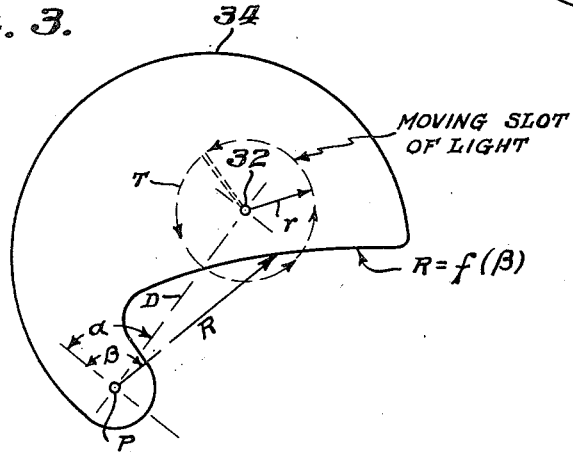
Inventor
Jan A. Rajchman
By
C.D. Tuska
Attorney Inventor
Jan A. Rajchman
By
Attorney Patented May 6, 1947

2,420,013

UNITED STATES PATENT OFFICE 2,420,013

ELECTRON COMPUTING DEVICE

Jan A. Rajchman, Princeton, N. J., assignor to Radio Corporation of America, a corporation of Delaware Division of abandoned application Serial No. 437,259, April 1, 1942. This application February 19, 1944, Serial No. 523,130

4 Claims. (Cl. 177—351)

This application is a divisional continuation of applicant's abandoned copending U. S. application, Serial No. 437,259 filed April 1, 1942, entitled "Electron computing devices," assigned to the same assignee as the instant application.

This invention relates generally to computing devices and particularly to electron computing devices in which current pulses, having a characteristic corresponding to a predetermined mathematical function of the variable angular displacement of two elements, are derived.

In the copending application of Jan A. Rajchman and Richard L. Snyder, Serial No. 437,002, filed March 31, 1942, there are disclosed several devices for deriving trains of voltage pulses, the number of pulses in each train being proportional to a function of the angular displacement of two elements. These devices depend upon the interruption of a light beam by fiducial marks on a mechanical device in relative motion with respect to the source of the light beam.

An object of this invention is to provide means for deriving electric current pulses having a frequency characteristic proportional to a function of the angular displacement of two mechanical elements, in which a carrier having fiducial marks characteristic of the desired mathematical function is not required. Another object of the invention is to provide means for deriving electric pulses, whose number per unit time is a function of the angular displacement of two mechanical elements, in which regularly occurring pulses, whose duration is proportional to the angular displacement of the elements, key a source of oscillations. Another object is to provide a computing device for the measurement of non-linear functions of the angular displacement of two mechanical elements from which may be derived a current of amplitude substantially proportional to the value of said function of the angular displacement of the elements. Still another object of the invention is to provide means for relatively rotating two masks of predetermined contour between a light source and a light responsive device to produce electric pulses of duration proportional to a predetermined function of the angular displacement of the two mechanical elements, to key a source of oscillations by said pulses and to derive an indication of the pulses per unit time generated by the light responsive device. Another object of the invention is to derive from the aforesaid means a current of amplitude substantially proportional to the angular displacement of said elements.

The invention will be described by reference to the drawings of which Figure 1 is a schematic diagram of one embodiment of the invention; Figure 2 is an elevational view of the fixed and rotating masks in the device shown in Figure 1; Figure 3 is an elevational view of a modification of the invention; Figure 4 is a schematic diagram of a circuit associated with the aforesaid embodiments, and Figure 5 is a series of graphs indicating the operating characteristics of the various circuit components of Fig. 4. Similar reference numerals are applied to similar elements throughout the drawings.

Referring to Figure 1, a motor 31 having a rotating shaft 32 rotates a disk 33 within which is included a narrow radial slot 44. A fixed mask 35 and a movable mask 34, arranged to form an aperture, are disposed adjacent to and coaxial with the rotating disk 33. The unmasked segment formed by the fixed and movable masks is proportional to the angular displacement to be measured. Light from the source 36 is interrupted by the fixed and movable masks and the rotating slotted disk and after interruption is reflected from a spherical mirror 37 to the light responsive device 38 which may be a conventional photoelectric cell or electron multiplier. The voltage on the leads 39 from the light responsive device 38 to the pulse oscillator 40 is represented by the square wave form 45. The pulse oscillator 40 may be of any conventional type or a relaxation oscillator or a multivibrator. The square wave voltage 45 will be of duration $\alpha$ proportional to the angular displacement of the elements to be measured. This voltage keys the output of the pulse oscillator 40. The normal wave form 46 of a typical oscillator will, after keying, have the wave form 47. Voltage of this wave shape may be applied to a conventional electronic counter which may be of the type described in the article by H. Lifschitz and J. L. Lawson in the Review of Scientific Instruments, vol. 9 of March 1938, or applied to the input terminals 10 of the frequency measuring circuit 43 described hereinafter and described and claimed in the copending U. S. application, Serial No. 437,260, filed April 1, 1942, by Jan A. Rajchman and Edwin A. Goldberg. A current of amplitude substantially proportional to the number of pulses per unit time, may be derived from the output of this circuit.

Figure 2 shows the arrangement of the fixed, movable and rotating masks of the device described in Fig. 1. This structure is designed for the linear measurement of angular displacement of the mechanical elements under observation.

Figure 3 shows a typical movable mask 34, of contour determined by the mathematical or trigonometrical function of the angular displacement desired. The mask 33 is rotated about the axis P which is eccentric with respect to the motor shaft 32. The path of the light beam through the peripheral point of the slot 44 of the rotating disk 33 is shown by the dashed circle T. The axis P may be at any desired distance from the axis of the shaft 32 and may be either inside or outside of the periphery of the light path T. The angle $\alpha$ through which the axis X of the mask 34 is rotated, with respect to the line D connecting the axis P with the shaft 32, corresponds with the angular displacement of the mechanical elements to be measured. The contour of the mask and the distance D between the axes of the disk and the mask will be determined by the mathematical or trigonometrical function of the angular displacement which is desired. The foregoing embodiments may be utilized in conjunction with the mechanical systems disclosed and claimed in the copending U. S. application of Jan A. Rajchman and Richard L. Snyder, Serial No. 437,002, filed March 31, 1942, insofar as methods and means for forming and light scanning an adjustable aperture is concerned.

Referring to Fig. 4, the circuit 43 for utilizing the voltage pulses derived from the light responsive device 38 utilizes a unique arrangement of thermionic tube circuits including a band pass filter, one or more saturation amplifiers, a differentiating circuit, a peak amplifier, and a novel trigger circuit, as well as means for damping the differentiating circuit and the trigger circuit.

The source of voltage pulses, which may include a plurality of frequency components, is applied to the input terminals 10 of a filter circuit 9 which is designed to pass the frequency band which is to be measured. The output of the filter 9 is applied to the grid circuit of a first thermionic tube 1. The grid bias is adjusted to limit the amplitude of the signals to be measured in order to eliminate, as much as possible, response to extraneous signals. The first tube 1 is operated at the saturation portion of its static characteristic in order to derive an output signal which is substantially of square wave form. The signal is further amplified by the second thermionic tube 2 which is also operated at the saturation point of its static characteristic in order to further improve the square wave form of the signal. The signal of substantially square wave form is next applied to the input circuit of the third thermionic tube 3. The anode circuit of the third tube 3 includes a two-position switch 20 which is connected in one position to one terminal of a resistor 19 and in another position to one terminal of an inductor 11. The movable arm of the switch 20 is connected to the cathode of the first diode 4 and to one terminal of the capacitor 21. The remaining terminals of the resistor 19, inductor 11 and the anode of the first diode 4 are all connected through an anode resistor 24 to the source of high potential for the anode of the tube 3. The remaining terminal of the capacitor 21 is connected to the control electrode of a peak amplifier thermionic tube 5, which is biased to amplify only the voltage peaks of the applied signal. The cathode circuit of the third tube 5 includes a cathode resistor 22. Voltage across this resistor is applied to the cathode circuit of a first trigger tube 7. The control electrode or the first trigger tube 7 is connected to the anode of the second diode 6, to one terminal of the grid resistor 15, and to one terminal of the capacitor 13. The cathode of the second diode 6 and the remaining terminal of the resistor 15 are connected to ground. The remaining terminal of capacitor 13 is connected to the anode of the second trigger tube 8 and to one terminal of a resistance network 23. The remaining input terminal of the resistance network 23 is connected to a source of anode potential for the second trigger tube 8. The anode of the first trigger tube 7 is connected to the control electrode of the second trigger tube 8 and to one terminal of a coupling resistor 14. The remaining terminal of the resistor 14 is connected through the resistor 25 to a source of anode potential for the first trigger tube 7.

The operation of the circuit is as follows: The desired frequency component of the signal to be measured is derived from the filter 9 and applied to the control electrode of the first tube 1 which provides high amplification and because of its saturation characteristics, clips the peaks of the signal wave. The signal is further amplified and clipped by a similar action in the second tube 2 and applied as a signal of substantially square wave form to the input of the third tube 3. When the switch 20 is connected to the inductor 11, the third tube 3 is operated to shock-excite the tuned circuit comprising the natural resonant characteristics of the inductor 11, to derive a series of pulses of decreasing amplitude from each square wave pulse applied to the circuit. The first diode 4 provides considerable damping of the pulses of decreasing amplitude to eliminate substantially all of the pulse signal except the first positive cycle. If the switch 20 is connected to the resistor 19, the resistance capacity network 19—21 acts as a differentiating circuit. In this network, the voltage across the capacitor 21 will be substantially proportional to the rate of change of the square wave signal applied to the network and will therefore include only a sharp positive and negative pulse for each cycle of the square wave signal. When using the differentiating network, the damping diode 4 may be omitted, since it will have little effect on the circuit operation.

Signals derived from the circuit with either position of the switch 20 are then applied as pulses to the control electrode of the peak amplifier 5. If desired, either the inductor 11 or the resistor 19, and the switch 20 may be omitted. This tube is biased to clip off and amplify only a positive peak portion of the pulse applied to the control electrode.

Sharply peaked voltages from the cathode circuit of the peak amplifier 5 are taken from across the cathode resistor 22 connected to the cathode of the peak amplifier 5 and applied to the input circuit of the first trigger tube 7.

The operation of the trigger circuit is as follows: The first trigger tube 7 is biased so that it is normally conducting while the second trigger tube 8 is biased so that it is normally non-conducting. When a positive pulse from the peak amplifier 5 is applied to the cathode of the first trigger tube 7, the first trigger tube 7 is biased to cut-off and the second trigger tube 8 is made to conduct. This condition continues after the exciting pulse has passed, and until the grid of the first trigger tube 7 which has been driven to cut off by the charge on the capacitor 13 becomes sufficiently positive for the first trigger tube 7 to again become conducting and the second trigger tube 8 non-conducting. For a single exciting pulse, the time during which the second trigger tube 8 will become conducting depends upon the capacitance of the capacitor 13, the grid capacitance of the first trigger tube 7, the resistance of the resistors 14 and 15, the cut-off voltage of the first trigger tube 7 as well as the rate of change of the maximum voltage on the anode of the second trigger tube 8 when the tube is suddenly made to conduct. Since all of these constants can be calculated and fixed, the circuit can be adjusted to any desired time constant. The limit frequency of the circuit is dependent on the time required for the trigger tubes to return to their normal bias condition after actuation by an exciting pulse. This time interval may be greatly reduced by the use of the second diode 6 which has a damping action on the grid circuit of the first trigger tube 7 by providing substantial attenuation in the circuit when the grid of the first trigger tube 7 is at positive potential. The action of the second diode 6 also tends to make the duration of the current pulse in the anode circuit of the second trigger tube 8 more uniform. The amplitude of this pulse may be maintained at a substantially constant level by proper voltage regulation of the potentials applied to the trigger tube circuits. The current derived from the output terminals 12 of the resistance network 23 will be a fairly accurate indication of the average rate of occurrence of the exciting pulses applied to the cathode of the first trigger tube 7.

Figure 5A:
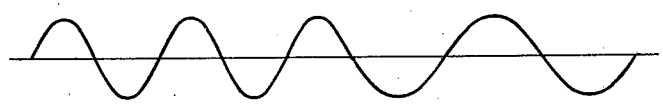
Figure 5B:
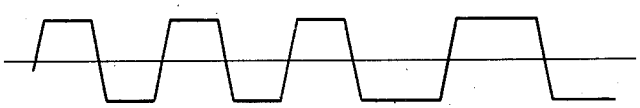
Figure 5C:
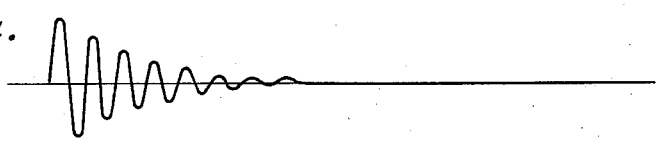
Figure 5D:
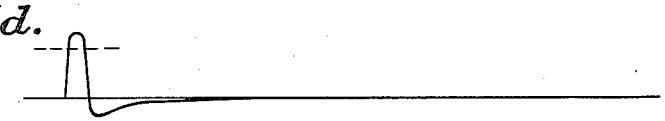
Figure 5E:
Figure 5F:
Figure 5G:
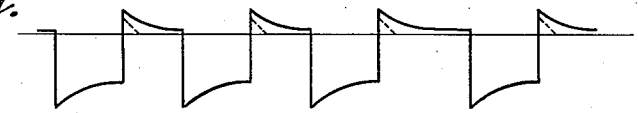

Fig. 5a of the drawing shows a typical sine wave signal applied to the input circuit of the first saturation amplifier tube 1. Fig. 5b shows a signal of substantially square wave form derived from the anode circuit of the second tube 2 and applied to the input circuit of the third tube 3. Fig. 5c shows the wave form comprising pulses of diminishing amplitude derived from the tuned circuit 11 when the switch 20 is connected to the inductor 11. Fig. 5d shows the damping of the pulse current by the first diode 4. The portion of the graph above the dashed line P indicates the positive portion of the pulse current which actuates the peak amplifier tube 5. Fig. 5e shows the positive pulse derived from across the resistor 22 in the cathode circuit of the peak amplifier tube 5. Fig. 5g shows the potential variations on the grid of the first trigger tube 7 caused by the application of the pulse shown in Fig. 5e. Fig. 5f shows the corresponding potential variations in the anode circuit of the second trigger tube 8 which are applied to the resistance network 23. The dashed lines in Fig. 5g indicate the damping action of the second diode 6 and clearly show the action of this tube in decreasing the time required for the trigger tubes 7 and 8 to return to their normal bias condition.

It should be understood that the filter 9, tubes 1, 2, 3, 4 and 5, or any of them, may be omitted if the signal to be measured has suitable characteristics for the actuation of the trigger circuit comprising the tubes 6, 7, and 8. It should also be understood that the second diode 6 may be omitted if the operating frequency of the circuit is sufficiently low to permit the trigger tubes 7 and 8 to return to normal bias condition without the damping action of the second diode 6.

I claim as my invention:

1. In a computer for substantially continuously deriving a mathematical function of the variable angular displacement of two elements, a continuously rotatable apertured mask, a movable mask disposed to rotate on a different axis than said apertured mask to form with said rotatable mask aperture an adjustable selectively-opened aperture having an opening time interval during each revolution of said rotatable mask which is a non-linear function of said angular displacement, a light source, a light-responsive device associated with said light source, means for directing light from said source through said adjustable aperture for interrupting said light to derive voltage pulses from said responsive device, a continuously operable constant frequency pulse generator, and means for keying said generator by said voltage pulses to indicate the value of said function.

2. Apparatus of the type described in claim 1 characterized by said rotatable mask having a radial slit.

3. Apparatus of the type described in claim 1, including a reflector associated with said light responsive device.

4. In a computer for substantially continuously deriving the values of a predetermined non-linear mathematical function of the variable angular displacement of two elements, a continuously rotatable mask having a radial aperture, a movable eccentric mask disposed to rotate on a different axis than said apertured mask to form with said rotatable aperture an adjustable selectively-opened aperture having an opening time interval during each revolution of said rotatable mask which is a non-linear function of said angular displacement, a light source, a light responsive device associated with said light source, means for directing light from said source through said adjustable aperture for interrupting said light to derive voltage pulses from said responsive device, a continuously operable pulse generator, means for keying said generator by said voltage pulses, and means for counting the number of keyed pulses per unit of time from said generator to indicate the value of said function.

JAN A. RAJCHMAN.

REFERENCES CITED

The following references are of record in the file of this patent:

UNITED STATES PATENTS

| Number | Name | Date |
| --- | --- | --- |
| 2,176,720 | Rayner | Oct. 17, 1939 |
| 2,277,285 | Woodling | Mar. 24, 1942 |

FOREIGN PATENTS

| Number | Country | Date |
| --- | --- | --- |
| 460,187 | British | Jan. 18, 1937 |
| 47,233 | French | Nov. 25, 1936 |
| 465,406 | British | May 3, 1937 |